March 14, 1967 A. H. SINGLETON 3,308,646
TEMPERATURE MEASUREMENT
Filed Oct. 14, 1964 2 Sheets-Sheet 1
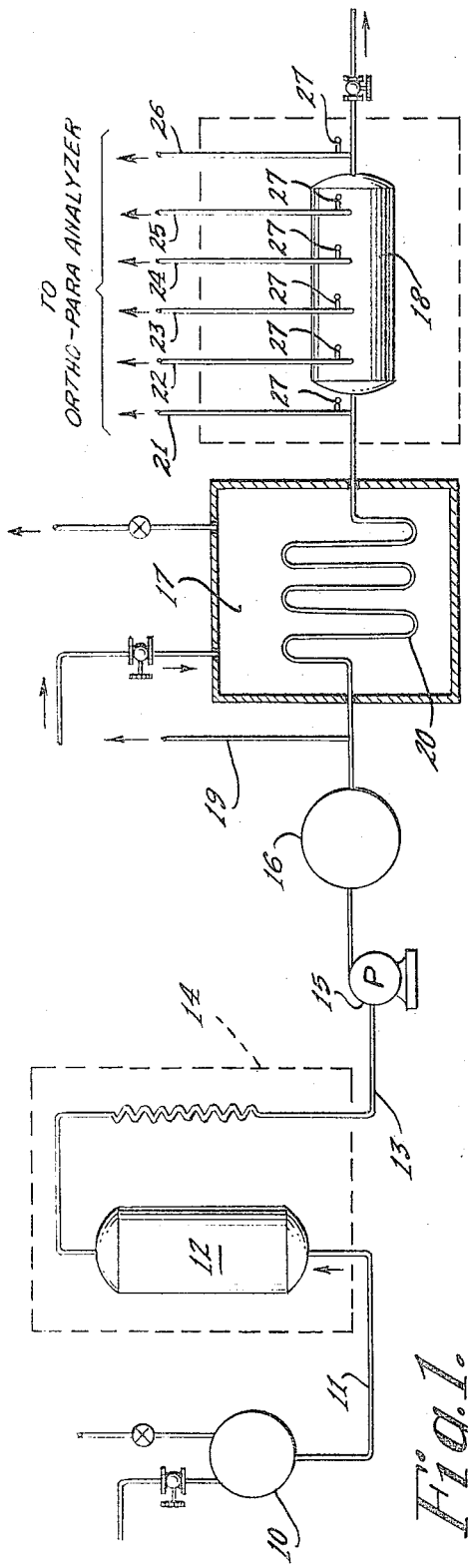
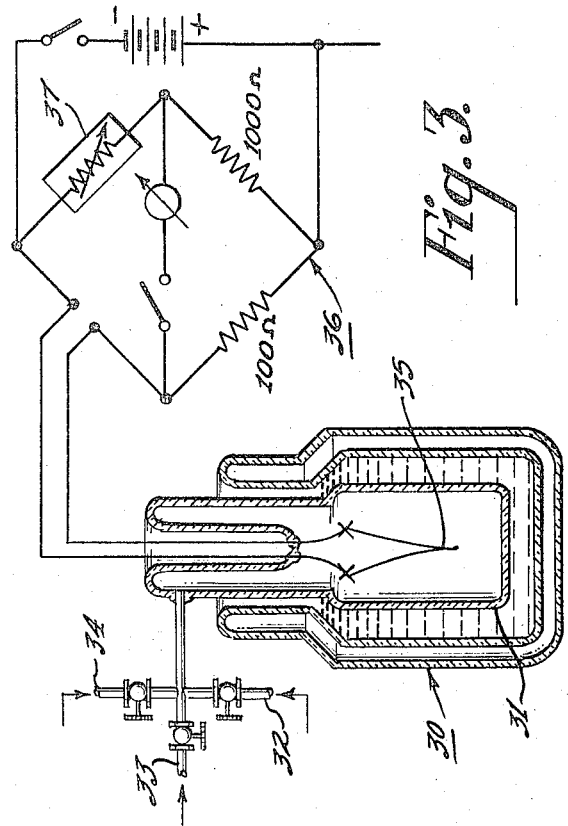
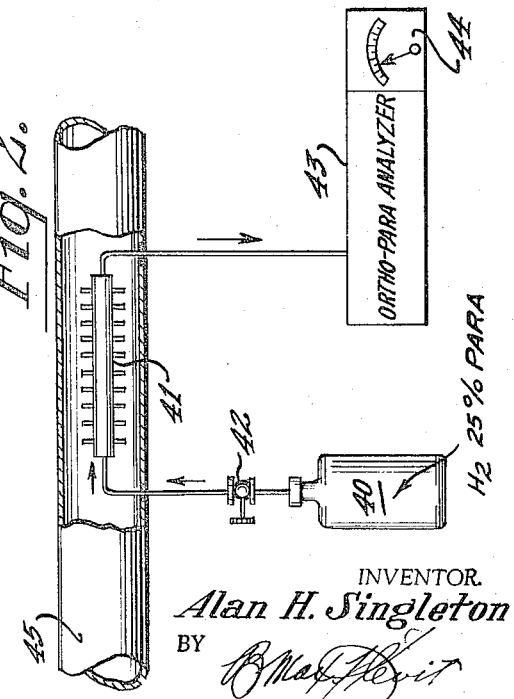
INVENTOR.
*Alan H. Singleton*
BY
*ATTORNEY.*

United States Patent Office 3,308,646
Patented Mar. 14, 1967

3,308,646
TEMPERATURE MEASUREMENT
Alan H. Singleton, Emmaus, Pa., assignor to Air Products and Chemicals, Inc., Philadelphia, Pa., a corporation of Delaware
Filed Oct. 14, 1964, Ser. No. 403,826
8 Claims. (Cl. 73—1)

The present invention relates to methods and apparatus for accurate temperature measurement in the low temperature range.

Among the desirable objectives achieved by the present invention is the provision of a temperature sensing system that can be utilized either as a primary standard for calibration of other temperature sensing and measuring devices, or for direct temperature measurement, particularly of temperatures in the cryogenic region. The system of the invention has, in addition, special importance in accurate temperature determination in the region between the boiling point of neon and the triple point of nitrogen (49–113.8° R.) in which region a convenient primary standard for calibration of secondary temperature measuring instruments is notably lacking. The novel system and techniques utilized in practice of the invention afford unusually high sensitivity and exceptional accuracy in the measurement of temperatures in the cryogenic region since the operation makes use of reliably well-established thermodynamic equilibrium relationships; namely, the existing relationship between temperature and the ortho-para composition of hydrogen gas at equilibrium.

It is known that molecular hydrogen exists in two isomeric forms; in one of these, called ortho hydrogen, the spins of the two atomic nuclei composing the molecule are in the same direction, while in the other form, called para hydrogen, the spins are in opposite directions. See G. E. Schmauch and A. H. Singleton: Technical Aspects of Ortho-Para Hydrogen Conversion; Ind. and Eng. Chem., May 1964, vol. 56, pages 20 to 32; and Schmauch, Kucirka and Clark: Activity Data on Improved Para-Ortho Conversion Catalysts; Chemical Engineering Progress, August 1963, vol. 59, pp. 55–60, and references cited in the publications.

Ortho and para hydrogen are distinguished by differences in internal molecular energy, the ortho form representing a higher energy level. This energy difference, among other observed distinctions in the properties of the two forms, is evidenced by a dependent relationship between temperature and relative proportions of ortho and para forms present at equilibrium. With increasing temperature, the proportion of that component of higher internal energy—ortho hydrogen—is directly increased. Thus, at or near absolute zero the equilibrium composition consists of pure para hydrogen. At temperatures approaching 490° R. limiting proportions are attained approaching as asymptote at about 75% ortho hydrogen (3:1).

The nuclear spin of the hydrogen molecule arising from the different orientations of the nuclear spins of the individual atoms therein, contributes to the total rotational energy of the molecule which can exist only in certain discrete quantities or energy levels. These rotational energy levels are designated by rotational quantum numbers, $j$, which can have integral values such as 0, 1, 2, 3, 4 . . . corresponding to increasing discrete amounts of rotational energy. It happens that *even* rotational quantum numbers (0, 2, 4 . . . ) refer to energy levels which can be occupied only by para molecules and *odd* rotational quantum numbers (1, 3, 5 . . . ) refer to levels which can be occupied only by ortho molecules.

At equilibrium, the molecules are distributed throughout these various energy levels as a function of temperature. The ortho-para ratio is thus determined by the number of molecules occupying *odd* or *even* energy states, respectively. If the temperature is changed, the equilibrium energy distribution is also changed. The equilibrium para-ortho ratio is predicted theoretically from quantum mechanical considerations as a result of the Maxwell-Boltzmann distribution law. The result is the following: [See G. S. Rushbrooke, Introduction to Statistical Mechanics, Oxford University Press, London, chapter VII (1949)].

$$\frac{C_e}{1-C_e} = \frac{1+5\exp(-\epsilon_2/kT)+9\exp(-\epsilon_4/kT)+13\exp(-\epsilon_6/kT)+\ldots}{3[3\exp(-\epsilon_1/kT)+7\exp(-\epsilon_3/kT)+11\exp(-\epsilon_5/kt)+\ldots]}$$

in which $C_e$ is the concentration of para hydrogen at equilibrium and $(1-C_e)$ is the concentration of ortho. The temperature T which appears in the equation is the thermodynamic, or absolute, temperature. Thus, the measurement of $C_e$ at a particular temperature is likewise a measure of the absolute temperature. The "$k$" in the formula is Boltzmann's constant.

The terms in the exponential are evaluated in the following manner:

$$\epsilon j = \frac{h^2}{8\pi^2 A} j(j+1)$$

where $h$=Planck's constant
$A$=the moment of inertia of the hydrogen molecule about an axis perpendicular to its length and through its center of mass
$j$=rotational quantum numbers—the integers 0, 1, 3 . . . .

The accuracy with which the temperature corresponding to a particular equilibrium composition can be evaluated depends on the accuracy of the ratio $h^2/Ak$.

These equilibria of ortho-para content at different temperature levels have been calculated theoretically by thermodynamic methods and have also been determined experimentally. Since the thermal conductivity and specific heat is different for each of these isomers, there properties are utilized in determining the ortho-para composition of equilibrium hydrogen mixtures.

The change in the proportions of ortho and para hydrogen in a gas mixture of these takes place only very gradually on altering the temperature of the gas so that the known phenomenum above has no practical application in temperature determination. It was found, for example (Bonhoeffer and Hartech, Naturwissenchaft, 1929, 17, 182), that equilibrium under some conditions was not reached in a year. In the presence of suitable catalyst, however, the rate of achieving equilibrium can be vastly accelerated.

In accordance with the present invention precise temperature measurement in the low temperature region is made possible by bringing a hydrogen gas stream rapidly to equilibrium in the presence of a highly active ortho-para conversion catalyst, in the environment of the region whose temperature is to be determined. By analyzing the hydrogen mixture obtained by the catalytic isomerization and determining the relative proportions of ortho and para hydrogen present therein, the temperature can be ascertained by reference to known temperature-composition relationships.

In accordance with one aspect of the present invention a hydrogen gas stream of known high para content is brought to a controlled low temperature and passed over an extended bed of high activity ortho-para conversion catalyst at a controlled rate such that the ortho-para composition profile through the bed in the direction of gas flow levels off to a constant para content indicative that equilibrium is achieved in the effluent. Sampling lines associated with conventional temperature sensing means, such as thermocouples, are provided at various portions of the bed. The para hydrogen content of the gas in each sampling line is determined in known manner by use of a thermal conductivity analyzer and the temperature of that stream ascertained by reference to available charts or tables relating absolute temperature to percent para hydrogen at equilibrium and constant enthalpy relations in the adiabatic reaction path towards equilibrium. In this manner the thermocouple associated with each such sample stream along the length of the catalyst bed can be readily calibrated.

In accordance with another aspect of the invention a novel means is provided for direct temperature measurement of an environment in the cryogenic region. The temperature sensing device consists of a small catalyst tube or chamber designed in such manner that it is in thermal equilibrium with the environment whose temperature is being measured. Hydrogen is passed through the chamber at such rate that para-ortho equilibrium is attained. The composition of the equilibrated gas is determined by thermal conductivity measurement and the measured temperature ascertained by reference to known equilibrium composition-temperature relationships.

The operation of the invention will be understood and the advantages thereof appreciated from the detailed description which follows read in connection with the accompanying drawings, wherein FIGURE 1 is a diagrammatic illustration of an arrangement for utilization of the invention in calibrating conventional temperature measuring devices.

FIGURE 2 is a diagrammatic illustration of an arrangement for practice of the invention in direct temperature measurement.

FIGURE 3 is a partial schematic view of a typical thermal conductivity analyzer.

Figure 4:
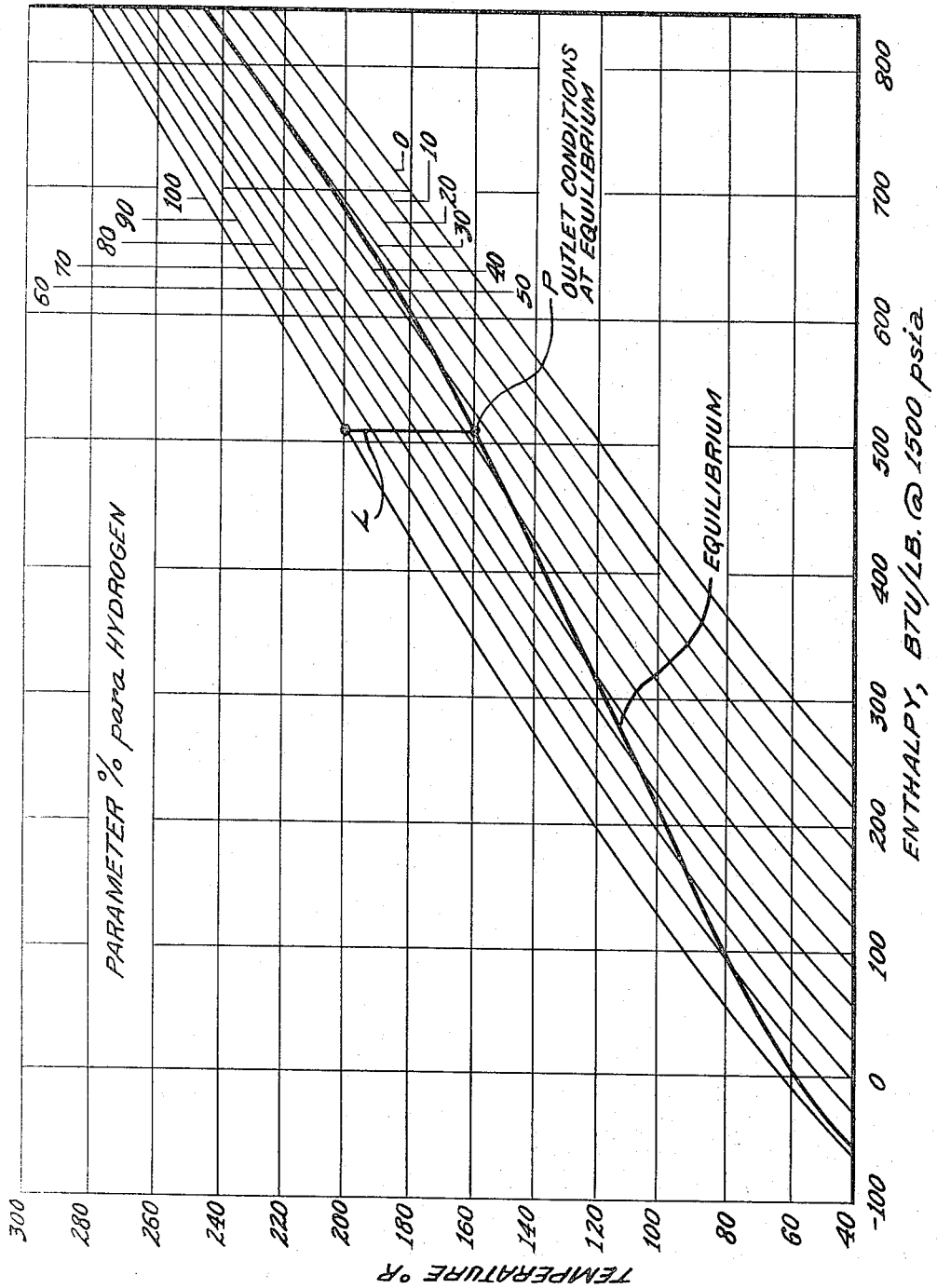
FIGURE 4 is a standard temperature enthalpy diagram.

Referring now to FIGURE 1, there is shown a storage vessel 10 adapted to contain liquid hydrogen connected by line 11 to a catalytic converter 12 containing solid catalyst having high activity in ortho-para hydrogen conversion. The catalytic converter 12 is preferably enclosed in a refrigerated and insulated area which can be kept at desired cryogenic temperature level by suitable liquefied gas. The refrigerated area may be maintained at a temperature below about 40° R. with liquid hydrogen so as to obtain in the discharge line 13 a hydrogen composition of high para content and close to equilibrium, say in the order of 99% para hydrogen.

The cold hydrogen effluent from line 13 is withdrawn by a pump 15 discharging into a surge tank 16. The hydrogen from the surge tank passes through a temperature controller section 17 and is discharged at the desired controlled temperature into a catalytic test section 18 containing high activity ortho-para equilibrating catalyst. Between the surge tank and the temperature controller a branch line 19 is provided for withdrawing span gas of high para content, which gas can be used in calibrating the ortho-para analyzer.

The temperature controller section 17 is provided with means to bring (by heating or cooling) the contents of the fluid stream 20 passed therethrough to desired fixed temperature.

The arrangement illustrated in FIGURE 1 was particularly designed to test activity of various catalysts in promoting ortho-para hydrogen conversion, and in studying the effects of different process variables on rate and extent of conversion. In practice of the invention for calibration of temperature sensing or measuring instruments the particular equipment thus far described is not essential. In practical operation it is desirable to have available several hydrogen reference gases of known or predetermined composition, for example, a normal hydrogen gas (~25% para hydrogen) and a hydrogen gas stream useful as span gas equilibrated at a fixed temperature point, such as at the boiling point of liquid nitrogen or of liquid hydrogen. These reference gases can be used in initial calibration of the thermal conductivity analyzer or other ortho-para hydrogen analyzer, as will be described below.

In the particular embodiment described above, the gas admitted to the converter 18 is of high para content above its equilibrium value. Since the conversion from the para to ortho form is endothermic at cryogenic temperatures there will be a drop in temperature along the catalyst bed in reactor 18 in the direction of fluid passage from inlet to discharge so long as conversion is taking place, that is up to the point that equilibrium is possibly achieved. As shown in FIGURE 1, a number of sample lines 21 to 26, or as many as desired, are provided along the path of flow of the hydrogen stream, these lines being spaced at the inlet and outlet of the catalytic converter 18 and at several points along the catalyst bed therein. Each sample line is associated with a temperature measuring device 27, such as a thermocouple. Each of the lines 21 to 26 leads to a suitable ortho-para hydrogen analyzer, such as a conventional thermal conductivity analyzer (see Schmauch et al., op. cit., pages 56 and 57). One form of such analyzer is illustrated diagrammatically in FIGURE 3. The thermal conductivity technique for the analysis of such gas mixtures operates on the principle that the thermal conductivity of para-hydrogen is somewhat greater than that of ortho hydrogen at all temperatures over the range 100° to 540° R.

The gas to be analyzed is passed through a standard Gow-Mac thermal conductivity cell connected in a Wheatstone bridge arrangement and maintained in a constant temperature bath (e.g. oil at 250° C.). The readout of the Wheatstone bridge is in millivolts. The instrument is calibrated over a desired temperature range by use of two known reference standards. For example, at one end of the range the reference gas may be normal hydrogen (~25% para) and at the other end hydrogen equilibrated in a boiling cryogenic liquid, for example, a boiling nitrogen bath (~50% para). The analysis makes use of the observation that a linear relationship exists between the readout of the Wheatstone bridge (E.M.F. in millivolts) and the composition of the gas. By setting the instrument reading to 0.000 millivolt for the normal hydrogen and reading the E.M.F. corresponding to the conductivity of the span gas, there is a linear relation established by which the percent para hydrogen in the sample composition is determined by the measured conductivity of such composition (readout in millivolts).

In the arrangement of the analyzer illustrated in FIGURE 3, there is shown an insulated conductivity cell 30 provided therein with a closed gas chamber 31 surrounded by a bath of constant temperature. The gas chamber is in communication with supply lines 32, 33, 34 for admission at will of normal hydrogen, span gas and the gas to be analyzed. A metallic filament 35 in the gas chamber 31 is capable of being heated by a small battery to desired temperature; for the present purposes in the range of about 280–320° R. This filament forms one arm of the Wheatstone bridge 36. The thermal conductivity of the gas surrounding the wire in the chamber controls the resistance of the wire. Thus, at constant heating current and pressure the wire will reach a higher temperature in normal hydrogen than in para hydrogen, because the latter has a higher thermal conductivity. The determined resistance of the wire can therefore be used as a measure of its temperature. By first calibrating the cell with ordinary hydrogen and with pure para hydrogen (or other span gas of known ortho-para composition), the analysis of the para content of an unknown hydrogen mixture is made possible, since there is a linear relationship between the conductivity and the para hydrogen content of the mixture. The dial or recorder on the variable resistance box 37 is designed to read in resistance units or voltage units, as desired.

In operation of the arrangement shown in FIGURE 1, the span gas from line 19 can be used in comparison with normal hydrogen to calibrate the analyzer. By analyzing the para content of the sample gas streams in lines 21 to 26, in the described manner, the temperature of that stream is ascertained from the established temperature-composition relation and the ascertained temperature can be used to check or calibrate the temperature sensing devices 27.

It will be understood that the sample gas streams 21 to 25 are probably not at ortho-para equilibrium for the corresponding temperature of each such stream; the stream in line 26 will be at or essentially at equilibrium. The flow rate of the hydrogen through the catalyst bed is set so that the para composition of the gas stream levels off to a constant along the length of the catalyst bed thus assuring that equilibrium is essentially attained at the outlet of the bed. The inlet temperature of the hydrogen stream at the intersection of line 21 is determined by reference to a hydrogen temperature-enthalpy diagram such as that illustrated in FIGURE 4. In this diagram the enthalpy (B.t.u./lb.) is plotted against the absolute temperature (° R.) at the known pressure of the system, for an equilibrium hydrogen stream and for various hydrogen streams as parameters from 0 to 100% para hydrogen.

The application of the technique employed will be best understood by illustrative example. Assume that the measured para content of the effluent from catalytic conversion is 45%. Referring to the diagram of FIGURE 4, this point is established as a reference point P on the equilibrium curve (at the intersection of the 45% para parameter with the equilibrium curve). Since the path of the adiabatic reaction, by definition, must fall on a constant enthalpy locus, the reaction path is graphically represented by the vertical line L drawn through this reference point. Now if the inlet composition employed contained 100% para hydrogen, the intersection of the line L with the 100% parameter fixes the inlet temperature at 200° R. If the analysis of the stream in line 23 shows a content of 60% para, by referring to the intersection of line L with the 60% parameter it is found that the temperature adjacent the temperature sensor 27 associated with line 23 is 169° R. and the sensor can be calibrated accordingly. In like manner the correct reading for each of the temperature sensing devices 27 can be established by the determined outlet equilibrium conditions.

In the use of the technique above described for calibration of secondary temperature sensing or measuring devices, the hydrogen employed as test gas need not be at thermodynamic equilibrium, since the thermal conductivity of the gas is determined by the actual content of para hydrogen. The thermal conductivity ratio of para to normal hydrogen ($K_p/K_n$) changes in known manner with temperature. (A. Farkas, "Orthohydrogen, Parahydrogen and Heavy Hydrogen," Cambridge University Press, London (1935).) At room temperature, this ratio is about 1.030. At lower cell temperatures down to about 150° R., higher thermal conductivity ratios obtain with consequent increase in the sensitivity of the instrument. Thus, with the cell immersed in a Dry-Ice acetone bath at a temperature of 350° R. the thermal conductivity ratio becomes 1.145. The highest ratios are obtained in the cell temperature range of about 150–400° R. with the optimum lying at about 250–290° R.

In FIGURE 2 there is shown an arrangement for direct temperature measurement. A source of normal hydrogen is shown at 40 connected to a finned tube 41 filled with high activity hydrogen equilibrating catalyst. The rate of flow of the hydrogen can be controlled by suitable valve means 42. The discharge end of the catalyst tube is connected by suitable gas flow line to the thermal conductivity analyzer 43 provided with a readout dial or recording device 44. One form of catalyst tube that has been successfully employed was constructed of 1/8" finned copper tubing 3½" in length and containing 78.5 milligrams of high activity catalyst for promoting ortho-para hydrogen conversion.

In the operation of the device, the catalyst tube is placed in the conduit or other environment 45 of which the local temperature is desired to be measured and the catalyst permitted to reach thermal equilibrium with its environment. High purity hydrogen, which may be normal hydrogen, supplied from the cylinder 40, is passed through the catalyst chamber 41 and the composition of the equilibrium hydrogen effluent from the catalyst chamber is measured in a thermal conductivity analyzer or other reliable analytical device. The hydrogen must be passed through the catalyst at a controlled rate such that para-ortho equilibrium is essentially attained in the effluent. Calibration of the analyzer is readily made by use of a pair of reference standards, for example normal hydrogen (~25% para) and hydrogen equilibrated at a fixed temperature such as at the boiling point of liquid nitrogen (~50% para). As above indicated, the readout of the system in millivolts is readily converted to absolute temperature units in view of known composition-temperature relations, or if desired, the indicator 44 can be arranged to read directly in temperature units.

In experimental evaluations employing the described concept by measuring the temperature of boiling oxygen at atmospheric temperature, the results obtained fell within ±0.05° R., which is within the calculated uncertainty band at this temperature. The temperature sensitivity of the device is proportional to the first derivative of the equilibrium composition-temperature curve. At 90° R. the resolution is ±0.016° R. and better than ±0.025° R. over the range 60 to 131° R. Over the entire range between 42 and 219° R., the resolution is better than 0.1° R.

The successful practical application of the described technique depends upon the use of high activity catalyst in the temperature sensing area which enables the reaction to rapidly approach equilibrium quite closely with only a small amount of catalyst. Small deviations from equilibrium in the equilibrated hydrogen stream leaving the catalyst chamber can be tolerated. The effect of this deviation on the accuracy of temperature determination has been evaluated from published kinetic data (Schmauch and Singleton, op. cit.). The possible error in temperature measurement as a result of non-equilibrium is represented by the equation:

$$\Delta T_E = \frac{\Delta C_E}{dC_e/dT}$$

in which $\Delta T_E$ = error in temperature measurement due to non-equilibrium
$\Delta C_E$ = deviation of outlet hydrogen composition from equilibrium
$C_e$ = mol fraction para hydrogen at equilibrium
$T$ = absolute temperature In a number of experimental runs made over high activity ortho-para conversion catalyst in the range of hydrogen flow rates up to 4 to 5 times the rate required to achieve equilibrium, (runs made over the range from about 0.25 to 2.5 grams of hydrogen per minute per gram of catalyst) the mol fraction departure of the outlet stream from equilibrium and the temperature error were separately plotted as a function of flow rate. It was found that the error in temperature measurement due to non-equilibrium conditions was less than $1 \times 10^{-6}$° R.

In Table I below there are shown the results obtained in two typical runs comparing the measured temperature with actual temperature of a boiling oxygen bath.

The system employed utilized a thermal conductivity cell provided with a reference side and a sample side. Normal hydrogen (25.07% para) was flowed continually through the reference and sample sides. The instrument was spanned by passing an equilibrium hydrogen stream of known composition—equilibrated at liquid nitrogen temperature—through the sample side. The temperature of the nitrogen bath (99.99% $N_2$) was taken as 139.12° R. evaluated by correction data for purity and deviation from standard atmospheric pressure (750±1/mm. Hg). In the first run a reading of 3.298 millivolts was obtained for the span gas and in the second run, made several hours later on fresh fluid, the reading was 3.262 millivolts, which values were employed as spanning constants in the runs made on boiling oxygen.

The data obtained in the runs made on boiling oxygen are tabulated below:

TABLE I

| Run | Temp. °R. | | Millivolts Measured | Conc. Mol Percent Para |
|---|---|---|---|---|
| | Measured | Calculated | | |
| 1 | 162.11 | 162.12 | 2.320 | 42.94 |
| 2 | 162.07 | 162.12 | 2.296 | 42.95 |

The composition of the hydrogen leaving the catalyst layer is calculated in the following manner.

$$C_E = C_R + \frac{\text{measured mv.}}{\text{Span mv.}}(C_S - C_R)$$

$C_E$ = mol percent para in equilibrated hydrogen gas
$C_R$ = mol percent para in reference hydrogen gas
$C_S$ = mol percent para in span gas The calculated temperature shown in the table is that of boiling oxygen bath corrected for oxygen purity (0.4% argon) and for pressure (750±1 mm. Hg). Applying the measured and known values in the two runs:

(1) $\quad C_E = 25.07 + \frac{2.320}{3.298}(50.48 - 25.07) = 42.94$ (2) $\quad C_E = 25.07 + \frac{2.296}{3.262}(50.48 - 25.07) = 42.95$ Referring to available composition-temperature charts, the corresponding temperatures are found as 162.11 and 162.07 respectively, corresponding to deviations of .01 and .05° R. from the actual.

A suitable catalyst of high activity for use in the temperature sensor is the commercially available unsupported iron gel catalyst (Weitzel U.S. 2,943,917). More active catalysts have since been developed including APACHI–1 catalyst described by Schmauch and Singleton (op. cit.) which was shown to have an activity of about ten times that of the iron gel catalyst. Improved iron gel catalyst has also been recently described (P. L. Barrick et al., Improved Ferric Oxide Gel Catalyst for Ortho-Parahydrogen Conversion; Paper F–2 of the 1964 Cryogenic Engineering Conference). The activity of the catalyst can be measured in terms of conversion of ortho to para hydrogen at various hydrogen flow rates while maintaining constant temperature and pressure, the activity being expressed as a reciprocal of time based on the slope of the straight line represented by the formula $$ktF/1-C_e$$

in which:

$F$ = the hydrogen flow rate (g. (gas)/min./g. (cat.))
$f$ = the static reaction rate constant (min.$^{-1}$)
$t$ = residence time in the catalyst chamber (min.)
$C_e$ = mol. fraction para hydrogen at equilibrium As shown in Table III of the cited Schmauch and Singleton publication, APACHI–1 catalyst has an activity of 2.6 min.$^{-1}$ as compared to iron gel catalyst activity of 0.25 min.$^{-1}$. Chromia-alumina catalyst, also compared, showed an activity of only 0.054 min.$^{-1}$. In general, catalysts having an activity equal or approaching at least that of heat activated iron oxide gel should be employed for accurate temperature detection; catalysts of significantly lower activity require comparatively large amounts of catalyst at the same hydrogen flow rates and introduce possible deviations as a result of long residence time required to approach equilibrium, inconstancy of results due to erratic flow through the catalyst layer, pressure drop and other accompanying effects. In absolute terms, the desirable catalysts can be designated as one having an activity of at least about 0.20 min.$^{-1}$ as determined by the expression $$\frac{Ftk}{1-C_e}$$

Preferred catalysts are those of higher activity, including newly developed catalysts having an activity of 3 to 10 times that of the standard iron gel catalyst.

Obviously, many modifications and variations of the invention as hereinbefore set forth may be made without departing from the spirit and scope thereof and therefor only such limitations shall be imposed as are indicated in the appended claims.

What is claimed is:

1. The method of determining the absolute temperature at a local region within a bed of catalyst effective in ortho-para hydrogen conversion, which comprises passing a stream of hydrogen through said catalyst bed at a rate such that equilibrium is essentially attained at the outlet of said bed, withdrawing at said local region an at least partially converted hydrogen stream, analyzing said withdrawn stream to determine the amount of para hydrogen present therein, and comparing the content of para hydrogen found by analysis with temperature-composition equilibria data to ascertain the temperature at said local region corresponding to the para hydrogen content of said converted stream.

2. The method of calibrating a secondary temperature sensing device operating in the cryogenic temperature region, which method comprises locating said sensing device within a local region of a bed of high activity catalyst effective in ortho-para hydrogen conversion, passing a stream of hydrogen through said catalyst bed under adiabatic conditions, withdrawing from the local region at approximately the location of said sensing device an at least partially converted hydrogen stream, analyzing said withdrawn stream to determine the para hydrogen content thereof, comparing the analyzed quantity of para hydrogen with temperature-composition equilibrium data and with temperature-enthalpy data to determine the temperature corresponding to the para content of said converted stream, and noting any deviation between the designated temperature of said secondary sensing device and the determined temperature found from said analysis.

3. The method for calibrating secondary temperature measuring instruments for use in measuring temperature in the cryogenic range, which method comprises associating with the temperature sensing portion of such instrument a layer of highly active ortho-para conversion catalyst, passing a stream of molecular hydrogen of high para hydrogen content through said layer of catalyst at controlled inlet temperature, withdrawing an at least partially converted stream of hydrogen from the catalyst layer at a point adjacent said sensing device, analyzing the withdrawn stream to determine the content of para hydrogen therein, and from such analysis evaluating the temperature in the immediate vicinity of said sensing device by reference to established equilibrium composition-temperature relationships at equilibrium as compared with the para hydrogen content of said analyzed stream.

4. The method of measuring absolute temperature in the approximate range of 49–114° F. which comprises establishing thermal equilibrium between a small enclosed body of highly active ortho-para conversion catalyst and the environment whose temperature is desired to be measured, passing a stream of molecular hydrogen through said body of catalyst at a rate such that para-ortho equilibrium is attained, withdrawing an equilibrium stream of hydrogen from the discharge end of said body, passing the equilibrium stream to a precalibrated thermal conductivity device, measuring the thermal conductivity of said equilibrium stream, and evaluating such measured conductivity in terms of temperature units from known linear relationship by comparison with the conductivity of a hydrogen stream of known para hydrogen content employed in calibrating said thermal conductivity device.

5. The method as defined in claim 4 wherein said stream of molecular hydrogen admitted to the body of catalyst has the ortho-para ratio of normal hydrogen.

6. A temperature measuring system operable in the cryogenic region which comprises in combination: a catalys-filled tube provided with gas inlet and gas outlet means at opposite ends of said tube, a hydrogen gas analyzer for determining ortho-para hydrogen ratio in gas flow communication with the outlet of said tube and an electrically-responsive readout device associated with said analyzer and having a scale graduated in indicia relatable to absolute temperature units.

7. A system as defined in claim 6 wherein said tube is provided at its external surface with heat-exchange fins and said tube has a dimension of length in the direction of gas flow therethrough several times that of any transverse dimension of said tube.

8. A temperature measuring system operable in the cryogenic range which comprises a narrow catalyst filled tube having a length of at least ten times its transverse dimensions, said tube having a gas feed inlet and a gas discharge outlet respectively at opposite ends thereof, gas conducting conduits communicating with said inlet and outlet respectively, said inlet communicating by said conduit with a gas supply source and said outlet communicating by said conduit with a hydrogen gas analyzer for determining ortho-para hydrogen ratio, said analyzer comprising a thermal conductivity cell and electrical means for measuring conductivity of an electrical conductor located within said cell, said electrical means being operatively associated with an inductor device responsive to conductivity changes in said conductor under the influence of the para hydrogen content of the gas admitted to said cell, said indicator device being provided with a readout indicia scale in temperature units.

References Cited by the Examiner

Schmauch et al., Chemical Engineering Progress, volume 59, No. 8, August 1963, pages 55–60, TP1.A6.

LOUIS R. PRINCE, *Primary Examiner.*

S. C. SWICHER, *Assistant Examiner.*

UNITED STATES PATENT OFFICE
CERTIFICATE OF CORRECTION

Patent No. 3,308,646            March 14, 1967

Alan H. Singleton

It is hereby certified that error appears in the above numbered patent requiring correction and that the said Letters Patent should read as corrected below.

Column 1, line 42, for "the" read -- these --; line 55, for "as" read -- an --; column 7, line 65, for "f", in italics, read -- k --, in italics; column 8, line 19, for "therefor" read -- therefore --; line 69, for "°F." read -- °R. --; column 9, lines 13 and 14, for "catalys" read -- catalyst --; column 10, line 14, for "inductor" read -- indicator --.

Signed and sealed this 5th day of November 1968.

(SEAL)
Attest:

Edward M. Fletcher, Jr.            EDWARD J. BRENNER
Attesting Officer            Commissioner of Patents